Patented Apr. 19, 1949

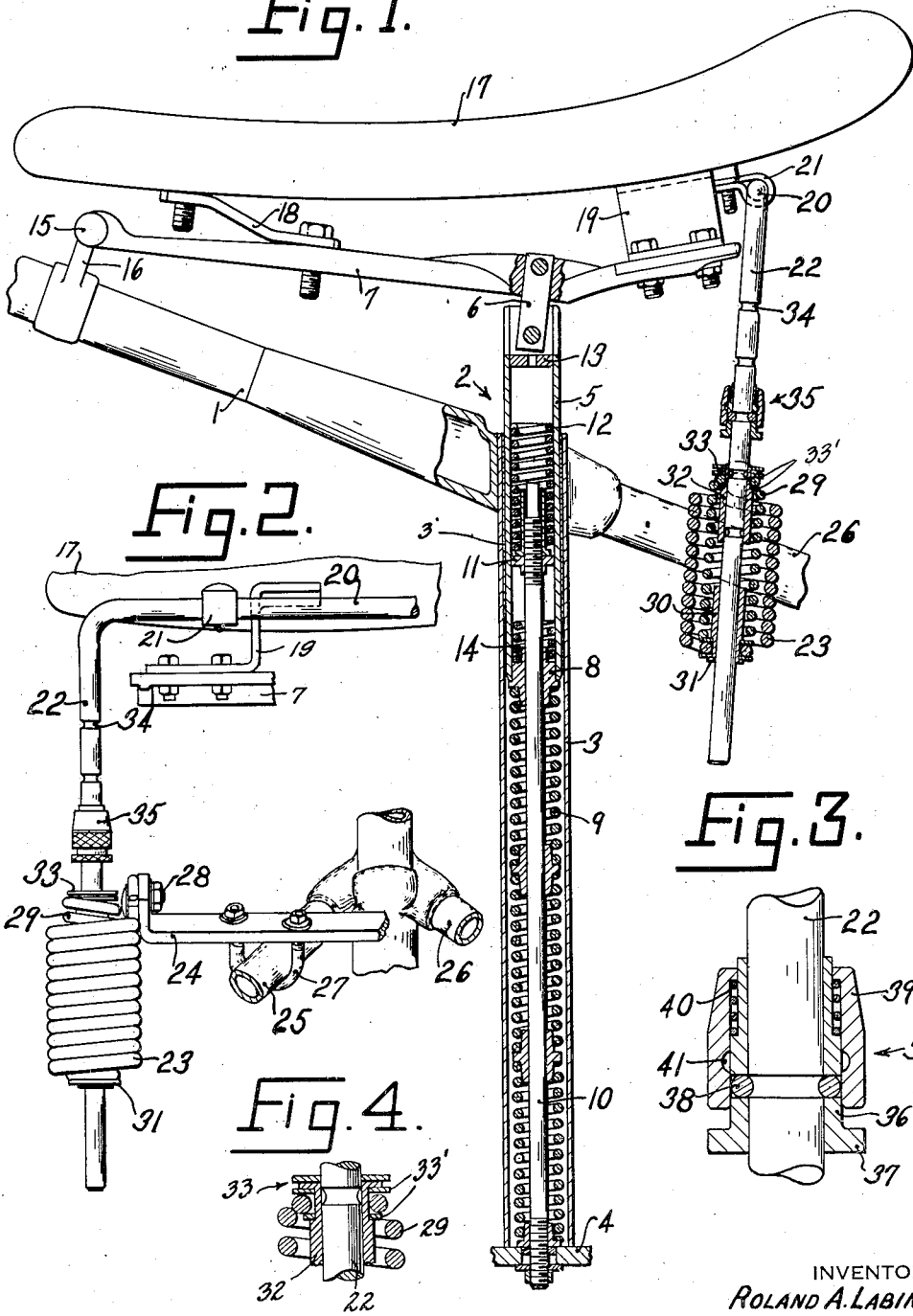

2,467,676

UNITED STATES PATENT OFFICE 2,467,676

SPRING SUSPENSION MEANS FOR SADDLES

Roland A. Labine, Springfield, Mass., assignor to Indian Motocycle Company, Springfield, Mass., a corporation of Massachusetts Application October 9, 1946, Serial No. 702,155

6 Claims. (Cl. 155—5.19)

This invention relates to spring suspension means for supporting a motorcycle saddle on the cycle frame and has for its object more particularly an easily adjusted arrangement for taking care of one or two riders on a single elongated saddle.

I am aware of the common use of pick-up springs in trucks and the like for the support of extra heavy loads and have adapted this principle of action to a special arrangement of spring suspension for saddles with the added modification that means are provided for a convenient manipulation of an adjustment of the same by a rider on the saddle.

The present arrangement comprises main and supplemental supporting springs in constant operative position for action at all times. The load is supported primarily on the main spring, and an adjustment is provided whereby more or less lost motion may precede the supporting action of the supplemental spring. In its preferred embodiment the means for adjusting the lost motion action of the supplemental spring comprises a collar fixable in different positions on a spring guide to serve as a spring abutment for the supplemental spring. The collar may be easily reached by a rider on the saddle and manipulated by hand either to provide no lost motion for the supplemental spring or for a varying amount of said lost motion depending on the weight of the load and the softness of ride desired.

The design and arrangement of the parts is such that when said supplemental spring abutment is adjusted for its widest limit of lost motion as for a lightweight single rider, the main spring normally supports the entire weight of the rider and the supplemental spring comes into operation only as a buffer or shock absorber in the cushioning of violent bumps. For carrying two riders or an unusually heavy load on the saddle, the aforesaid spring abutment may be adjusted so that the supplemental spring is in constant supporting action in cooperation with the main spring and their compression rates are constantly additive in supporting the load.

Referring to the drawings which show a preferred embodiment of my invention,

Fig. 1 is a fragmentary side view partly in section of a motorcycle frame showing the saddle mounted thereon;

Fig. 2 is a fragmentary rear view of the same to show the spring yoke and the manner of mounting the spring assembly on the frame;

Fig. 3 is an enlarged section of the stop collar spring abutment; and

Fig. 4 is a sectional view showing details on an enlarged scale of a portion of the supplemental rear spring suspension of Fig. 1.

Referring more particularly to the drawings, the top bar of the motorcycle frame is indicated at 1 and is provided with the usual form of resilient supporting seat post structure indicated generally at 2. This seat post structure is mounted in the vertically fixed tube 3 of the frame which tube extends downwardly to a stationary part 4 of the frame. Slidably mounted in tube 3 is the hollow seat post 5 fitted in a thin bushing sleeve 3' at the top of tube 3. Post 5 is pivotally coupled at its upper end to a link 6 which is fixed on the pillar bar 7 for the saddle. The lower end of the seat post 5 has fixed thereto a spring seat plug 8 below which is mounted a long coil compression spring 9 having its lower end abutting the base portion 4 of said frame. An inner rod 10 is fixed to the base portion 4 and extends upwardly through said coil spring 9 and seat plug 8, the latter being slidable on said stationary rod 10. The upper end of rod 10 has screw threaded thereon for different fixed adjustments, a plunger collar 11 on which is seated a bottoming spring 12 for the seat post. A vented plug 13 fixed in the top of the seat post 5 is adapted to abut the bottoming spring 12 on the down limit of the seat post stroke. A rebound spring 14 for the seat post 5 is also provided on the upper side of said spring seat plug 8, which is adapted to abut the collar 11 on the upward limit of the seat post stroke.

The pillar bar 7 of the saddle is pivotally connected at its forward end 15 to a bracket 16 on the frame bar 1. The saddle 17 may be of the usual elongated tandem type suitable for either one or two riders and is fastened by fixed brackets 18 and 19 to the pillar bar 7, as shown.

In addition to the resilient seat post structure above described the saddle is provided with a supplemental rear end spring suspension. This comprises an inverted U-shaped yoke member 20 pivotally mounted in bracket 21 fixed as by bolts to the underside of the saddle adjacent rear bracket 19 of the saddle. The depending legs of yoke member 20 serve as spring guides, one of which is shown at 22 in interslidable relation with a coacting spring assembly 23. It will be understood that both sides of the yoke and coacting spring assemblies therefor will be as shown in Figs. 1 and 2.

A transverse bracket or spring support 24, partly shown in Fig. 2, is firmly fastened to the rear fork bars 25, 26 of the frame as by clips such as at 27, Fig. 2. Each outer end of said bracket 24 carries a spring assembly such as 23 which is anchored at its upper end by a bolt 28 to said bracket 24.

Each rear spring assembly comprises an outer coil tension spring 23 with an inner compression spring 29. A lower sleeve 30 is slidable on the yoke leg 22 and has a clamping collar 31 by which the lower end of coil spring 23 is anchored. Spring 29 is supported on the collar 31. An upper sleeve 32 also slidable on the yoke leg 22 has fastened thereto the upper end of spring 29 by means of an abutment collar 33 similar to collar 31 and formed by upper and lower ring washer 33' set in a reduced portion of sleeve 32 (see Fig. 4).

Each depending leg such as 22 of the yoke 20 has formed thereon in spaced vertical relation a series of stop grooves 34. An adjustable stop collar 35 serving as a spring abutment is carried on each yoke leg adapted to be fixedly positioned at any one of said grooves 34. It will be understood of course that similar stop collars are adjusted on both legs of the yoke to coact with the similar spring assemblies at each end of bracket 24.

The construction of the stop collar assembly indicated as a whole at 35 will be clear from Fig. 3. An inner sleeve 36 has an abutment flange 37 formed at its lower end, and slightly above said flange 37 a series of holes are provided in the sleeve to retain a series of balls 38. The diameter of the balls 38 is slightly larger than the thickness of sleeve 36 whereby the balls will project therefrom at one side or the other. Closely surrounding and slidable on sleeve 36 is an outer sleeve 39. A spring 40 is mounted between said sleeves 36 and 39 tending to throw the outer sleeve 39 always upward with respect to the inner sleeve 36. The outer locking sleeve 39 has an annular groove 41 complemental to the grooves 34 in the leg 22. When the outer sleeve 39 is pushed down to register its groove 41 with the balls 38, the whole assembly or stop collar 35 may be shifted on the leg 22 until the balls are in register with one of the grooves 34. Then by releasing the outer sleeve 39 to the force of its spring 40, it will shift relatively up and lock the balls in said groove 34.

The operation of the rear spring suspension is as follows, it being understood that the adjustments for both sides of the yoke will be the same. When the stop collar 35 is adjusted to the uppermost groove 34 on leg 22 it will normally be spaced from the abutment 33 of the spring assembly 23, and the latter will function as a pick-up spring. The load on the saddle will be carried primarily by the seat post spring and there will be a lost motion action of leg 22 in the rear spring 23 until the saddle is depressed enough to bring stop collar 35 against the abutment 33. For any further depression of the saddle the load will then be supported on both the seat post spring and the rear spring assembly.

Normally a single rider of average weight will adjust the stop collar 35 to one of the upper grooves 34 and will be mainly carried on the seat post spring. Under such circumstances the lost motion action of the legs 22 will not be taken up except when encountering shocks or bumps in riding, at which times the rear springs will act as a terminating cushion or buffer for the shock.

When a heavy load or two average riders are on the seat, the stop collar 35 will be adjusted to one of the lower grooves 34 so that under the load carried, the collar 35 will be in constant contact against abutment 33. Under such circumstances both seat post spring and the rear spring assembly will be in constant action in carrying the load.

The stop collar 35 is easily manipulated by hand to its different stop positions and is also easily reached by a rider on the saddle so that all proper adjustments for a comfortable ride may be had for one or two riders.

What I claim is:

1. Spring supporting means for a motorcycle saddle on its cycle frame, comprising in combination, a main supporting spring mounted between said frame and the central portion of said saddle, a supplemental spring mounted on the frame in position for supporting the rear portion of said saddle from said frame, connecting means between said saddle and supplemental spring providing for lost motion in the supporting action of said supplemental spring, and means whereby the lost motion action is adjusted.

2. Spring supporting means for a motorcycle saddle on its cycle frame, said saddle having its front end pivotally connected to said frame comprising in combination, a spring supported seat post mounted in said frame and pivotally connected at its upper end to the central portion of said saddle, a supplemental spring mounted on the frame in position for supporting the rear portion of said saddle from said frame, connecting means between said saddle and supplemental spring providing for lost motion in the supporting action of said supplemental spring, and means whereby the lost motion action is adjusted.

3. Spring supporting means for a motorcycle saddle on its cycle frame, comprising in combination, a main supporting spring mounted between said frame and the central portion of said saddle, a supplemental spring assembly mounted on the frame in position for supporting the rear portion of said saddle from said frame, said spring assembly comprising a coil spring member and a spring guided member interslidable therewith, one of said members being connected to said frame, the other of said members being connected to the rear portion of said saddle, and a spring abutment adjustably mounted in different stop positions on said guided member for providing different amounts of lost motion connection between said guided member and said coil spring member.

4. Spring supporting means for a motorcycle saddle on its cycle frame, said saddle having its front end pivotally connected to said frame comprising in combination, a spring supported seat post mounted in said frame and pivotally connected at its upper end to the central portion of said saddle, a supplemental spring assembly mounted in position for supporting the rear portion of said saddle from said frame, said spring assembly comprising a coil spring member and a spring guided member interslidable therewith, one of said members being connected to said frame, the other of said members being connected to the rear portion of said saddle, and a spring abutment adjustably mounted in different stop positions on said guided member for providing different amounts of lost motion connection between said guided member and said coil spring member.

5. Spring supporting means for a motorcycle saddle on its cycle frame, comprising in combination, a main supporting spring mounted between said frame and the central portion of said saddle, a supplemental spring assembly mounted on the frame in position for supporting the rear portion of said saddle from said frame, said spring assembly comprising a transverse bracket fixed to said frame below the rear portion of said saddle, a coil spring mounted at each end of said bracket, a pair of spring guided members pivotally hung from the rear portion of said saddle and being respectively in interslidable relation with each of said coil springs, and a spring abutment on each guide adjustably mounted in different stop positions thereon for providing different amounts of lost motion connection between said guided members and their respective coil springs.

6. Spring supporting means for a motorcycle saddle on its cycle frame, comprising in combination, a main supporting spring mounted between said frame and the central portion of said saddle, a supplemental spring assembly mounted on the frame in position for supporting the rear portion of said saddle from said frame, said spring assembly comprising a transverse bracket fixed to said frame below the rear portion of said saddle, a coil spring mounted at each end of said bracket, a yoke member pivotally connected to a rear portion of said saddle and having a pair of depending legs in interslidable relation respectively with each of said coil springs, a series of annular stop grooves formed in spaced relation on each of said legs, and a spring abutment for each leg having means for adjusting the same in locked position at different stop grooves on its respective leg.

ROLAND A. LABINE.

REFERENCES CITED

The following references are of record in the file of this patent:

UNITED STATES PATENTS

| Number | Name | Date |
|--------|------|------|
| 478,581 | Elmore | July 12, 1892 |
| 606,413 | Holland | June 28, 1898 |

FOREIGN PATENTS

| Number | Country | Date |
|--------|---------|------|
| 10,882 | Great Britain | 1897 |
| 116,518 | Australia | Feb. 25, 1930 |